United States Patent
Caruso

(10) Patent No.: US 10,676,918 B2
(45) Date of Patent: Jun. 9, 2020

(54) DOUBLE-SIDED DRAINAGE-PROMOTING WRAP

(71) Applicant: Benjamin Obdyke Incorporated, Horsham, PA (US)

(72) Inventor: George Caruso, Ambler, PA (US)

(73) Assignee: Benjamin Obdyke Incorporated, Horsham, PA (US)

( * ) Notice: Subject to any disclaimer, the term of this patent is extended or adjusted under 35 U.S.C. 154(b) by 20 days.

(21) Appl. No.: 16/115,636

(22) Filed: Aug. 29, 2018

(65) Prior Publication Data

US 2019/0063061 A1 Feb. 28, 2019

Related U.S. Application Data

(60) Provisional application No. 62/551,508, filed on Aug. 29, 2017.

(51) Int. Cl.
| | |
|---|---|
| *E04B 1/62* | (2006.01) |
| *E04B 1/70* | (2006.01) |
| *B32B 3/18* | (2006.01) |
| *B32B 3/28* | (2006.01) |
| *B32B 5/02* | (2006.01) |

(Continued)

(52) U.S. Cl.
CPC ............ *E04B 1/625* (2013.01); *B32B 3/18* (2013.01); *B32B 3/28* (2013.01); *B32B 5/022* (2013.01); *B32B 5/024* (2013.01); *B32B 7/12* (2013.01); *B32B 27/12* (2013.01); *B32B 27/32* (2013.01); *E04B 1/70* (2013.01); *B32B 2307/712* (2013.01); *B32B 2419/06* (2013.01); *B32B 2607/00* (2013.01)

(58) Field of Classification Search
CPC ... E04B 1/625; E04B 1/70; B32B 3/18; B32B 3/28; B32B 5/022; B32B 5/024; B32B 7/12; B32B 27/12; B32B 27/32; B32B 38/06; B32B 2307/712; B32B 2419/06; B32B 2607/00
USPC ................................................. 52/302.6, 413
See application file for complete search history.

(56) References Cited

U.S. PATENT DOCUMENTS 3,738,905 A * 6/1973 Thomas ................. A47K 10/16
428/154
3,990,202 A * 11/1976 Becker .................. E04B 1/7092
52/172

(Continued)

FOREIGN PATENT DOCUMENTS

JP 01061224 A * 3/1989 ............... B32B 3/30

*Primary Examiner* — Patrick J Maestri
*Assistant Examiner* — Joseph J. Sadlon
(74) *Attorney, Agent, or Firm* — Howson & Howson LLP

(57) ABSTRACT

A drainage-promoting wrap for a building structure includes a weather-resistive membrane having a face with a series of separate, spaced-apart, spacer elements bonded thereto and projecting therefrom to a first predetermined height and an embossed membrane having embossments projecting from a face thereof to a second predetermined height. The weather-resistive membrane and embossed membrane are bonded together to form a double-sided drainage promoting wrap such that the spacer elements project from a first face of the wrap and the embossments project from an opposite face of the wrap. The first predetermined height may be greater than the second predetermined height. Wall and roof assemblies and a method of producing a wrap are also provided.

15 Claims, 2 Drawing Sheets

(51) Int. Cl.
  *B32B 27/12* (2006.01)
  *B32B 27/32* (2006.01)
  *B32B 7/12* (2006.01)

(56) References Cited

U.S. PATENT DOCUMENTS

| | | | | |
|---|---|---|---|---|
| 4,130,972 A * | 12/1978 | Varlonga | ............... | E04B 2/7411 52/241 |
| 4,320,162 A * | 3/1982 | Schulz | ............... | B31F 1/07 428/154 |
| 4,518,643 A * | 5/1985 | Francis | ............... | B29C 59/022 428/131 |
| 4,631,221 A * | 12/1986 | Disselbeck | ............... | B29C 51/00 428/166 |
| 5,374,477 A * | 12/1994 | Lawless | ............... | E04B 1/6809 428/317.3 |
| 5,453,142 A * | 9/1995 | Klein | ............... | B29C 63/04 156/201 |
| 5,497,596 A * | 3/1996 | Zatkulak | ............... | E04B 1/70 52/408 |
| 5,919,556 A * | 7/1999 | Barnholtz | ............... | B31F 1/07 428/218 |
| 6,221,463 B1 * | 4/2001 | White | ............... | B01D 53/885 428/174 |
| 6,331,345 B1 * | 12/2001 | Kauschke | ............... | B32B 27/12 428/156 |
| 6,355,333 B1 | 3/2002 | Waggoner et al. | | |
| 6,786,013 B2 | 9/2004 | Coulton | | |
| 6,797,354 B2 * | 9/2004 | Fleck | ............... | B32B 5/18 428/63 |
| 6,837,014 B2 * | 1/2005 | Virtanen | ............... | B29C 44/52 52/390 |
| 6,926,947 B1 * | 8/2005 | Seckel | ............... | B32B 1/00 206/585 |
| 6,990,775 B2 * | 1/2006 | Koester | ............... | E04B 1/70 428/121 |
| 7,048,987 B2 * | 5/2006 | Price | ............... | A47J 47/005 269/289 R |
| 7,201,946 B2 * | 4/2007 | Collins | ............... | B41M 3/006 427/428.06 |
| 7,338,700 B2 * | 3/2008 | McKenna | ............... | B32B 27/08 428/174 |
| 7,367,165 B2 * | 5/2008 | Hatzinikolas | ............ | E04B 1/7046 52/302.1 |
| 7,741,235 B2 * | 6/2010 | Hashimoto | ........ | A61F 13/49009 428/167 |
| 7,753,254 B2 * | 7/2010 | Straza | ............... | B23K 1/0008 228/193 |
| 8,018,655 B2 * | 9/2011 | Sacks | ............... | B32B 7/02 359/619 |
| 8,141,221 B2 * | 3/2012 | Webb | ............... | B32B 3/28 29/428 |
| D657,958 S | 4/2012 | Ehrman et al. | | |
| 8,458,987 B2 * | 6/2013 | Becker | ............... | B32B 3/28 52/746.1 |
| 8,528,265 B1 * | 9/2013 | Preston | ............... | E04F 13/0862 52/302.1 |
| 8,535,786 B2 * | 9/2013 | Schroer | ............... | B32B 5/26 428/194 |
| 8,598,470 B2 * | 12/2013 | Kagawa | ............... | B32B 3/30 174/386 |
| 8,734,932 B2 * | 5/2014 | Keene | ............... | B32B 5/26 181/288 |
| 8,806,825 B2 * | 8/2014 | Egan | ............... | E04B 1/762 428/317.5 |
| 8,813,433 B2 * | 8/2014 | Wilsey | ............... | E04B 7/08 52/79.1 |
| 8,813,443 B2 * | 8/2014 | Goldberg | ............... | E04B 1/70 52/209 |
| 8,919,061 B2 | 12/2014 | Kortuem et al. | | |
| 9,126,289 B2 * | 9/2015 | Herman | ............... | B23K 31/02 |
| 9,144,954 B2 | 9/2015 | Xiang Li | | |
| 9,415,563 B2 | 8/2016 | Xiang Li | | |
| 9,592,529 B2 | 3/2017 | Xiangli | | |
| 10,056,171 B2 * | 8/2018 | Manabe | ............... | H01B 7/045 |
| 10,265,928 B2 * | 4/2019 | Takano | ............... | B32B 3/30 |
| 10,293,981 B2 * | 5/2019 | Borchardt | ............... | B31F 1/20 |
| 2002/0164447 A1 * | 11/2002 | Asgian | ............... | E04B 1/66 428/40.1 |
| 2008/0092474 A1 * | 4/2008 | Gan | ............... | E04D 12/002 52/413 |
| 2010/0297424 A1 * | 11/2010 | Romes | ............... | B29C 44/12 428/307.7 |
| 2011/0209424 A1 * | 9/2011 | Longo | ............... | C09J 7/38 52/204.1 |
| 2012/0247040 A1 * | 10/2012 | Buoni | ............... | E04B 1/70 52/302.1 |
| 2012/0297711 A1 | 11/2012 | Ehrman et al. | | |
| 2014/0134408 A1 | 5/2014 | Milne et al. | | |

* cited by examiner

DOUBLE-SIDED DRAINAGE-PROMOTING WRAP

CROSS REFERENCE TO RELATED APPLICATIONS

This application claims the benefit under 35 USC § 119(e) of U.S. Provisional Patent Application No. 62/551,508, filed Aug. 29, 2017.

BACKGROUND

The present invention relates to moisture management within a building structure such as an exterior wall, roof or like structure.

A wall, roof or like structure of a building may include an inner sheathing member to which an exterior building material, such as exterior cladding or the like, is applied to form an exterior envelope or outer surface of the building. During wall or roof assembly, it is common practice to apply an intermediate water resistive covering or like layer over the inner sheathing member such that the water resistive covering is located between the inner sheathing member and the exterior cladding or like exterior building material. By way of example, the coverings may include building paper, tar paper, roofing felt, house or building wrap materials, and the like.

In some instances, moisture may penetrate the assembly and collect behind the cladding. For example, a so-called bulk water entry event may occur in which moisture penetrates the cladding during wind driven rain or the like entering via a leak or cladding failure. Moisture that penetrates the cladding will prematurely deteriorate the wall, roof or like building structure and permit mold growth if the moisture is permitted to accumulate therein.

Thus, for purposes of preventing moisture accumulation within such structures, a layer of an openwork material can be applied over the water resistive covering before the exterior cladding is installed to thereby create drainage passageways and an open air-space within the wall, roof or like building structure directly behind the exterior cladding. When such a material is installed within a wall, roof or like building structure, moisture penetrating the cladding is permitted to drain or/and evaporate and a better building envelope is provided that improves the sustainability of the building structure or home.

In some instances, moisture may collect behind the building paper, house-wrap, or the like such as when the paper or wrap tears or due to improper installation. In addition, vapor may migrate through the wall assembly from the interior of the building and condense as water on the sheathing members behind the paper or wrap.

Accordingly, a need remains for a drainage-promoting wrap that can be utilized in an exterior wall, roof or like structural assembly of a building to quickly and efficiently drain moisture that penetrates exterior cladding of walls, roofs and like building structures including when moisture enters or condenses behind the building paper, house-wrap, or the like.

SUMMARY

According to an embodiment, a drainage-promoting wrap for a building structure includes a weather-resistive membrane having a face with a series of separate, spaced-apart, spacer elements bonded thereto and projecting therefrom to a first predetermined height and an embossed membrane having raised embossments projecting from a face thereof to a second predetermined height. The weather-resistive membrane and embossed membrane are bonded together to form a double-sided drainage promoting wrap such that the spacer elements project from a first face of the wrap and the embossments project from an opposite face of the wrap. The first predetermined height, i.e., height of the spacer elements, may be greater than the second predetermined height, i.e., height of the raised embossments.

According to another embodiment, an assembly of an exterior building structure comprises an inner sheathing member, an exterior building material secured over the inner sheathing member and covering the inner sheathing member; and a double-sided drainage-promoting wrap secured within the assembly between the inner sheathing member and the outer building material. The double-sided drainage-promoting wrap comprises a weather-resistive membrane having a face with a series of separate, spaced-apart, spacer elements bonded thereto and projecting therefrom to a first predetermined height and an embossed membrane having raised embossments projecting from a face thereof to a second predetermined height. The weather-resistive membrane and the embossed membrane are bonded together such that the spacer elements project from a first face of the wrap and engage and confront the exterior building material and the embossments project from an opposite face of the double-sided drainage-promoting wrap and engage and confront the inner sheathing member.

According to another embodiment, a method of producing a double-sided drainage-promoting wrap for a building structure is provided. A series of separate, spaced-apart, spacer elements are bonded to a face of a weather-resistive membrane such that the spacer elements project therefrom to a first predetermined height. A separate embossed membrane is bonded to the weather-resistive membrane to form a double-sided drainage-promoting wrap such that the spacer elements project from a first face of the wrap and raised embossments of the embossed membrane project from an opposite face of the wrap to a second predetermined height. The first predetermined height may be greater than the second predetermined height.

BRIEF DESCRIPTION OF THE DRAWINGS

The features and advantages of the present invention should become apparent from the following description when taken in conjunction with the accompanying drawings, in which.

DETAILED DESCRIPTION

Figure 1:
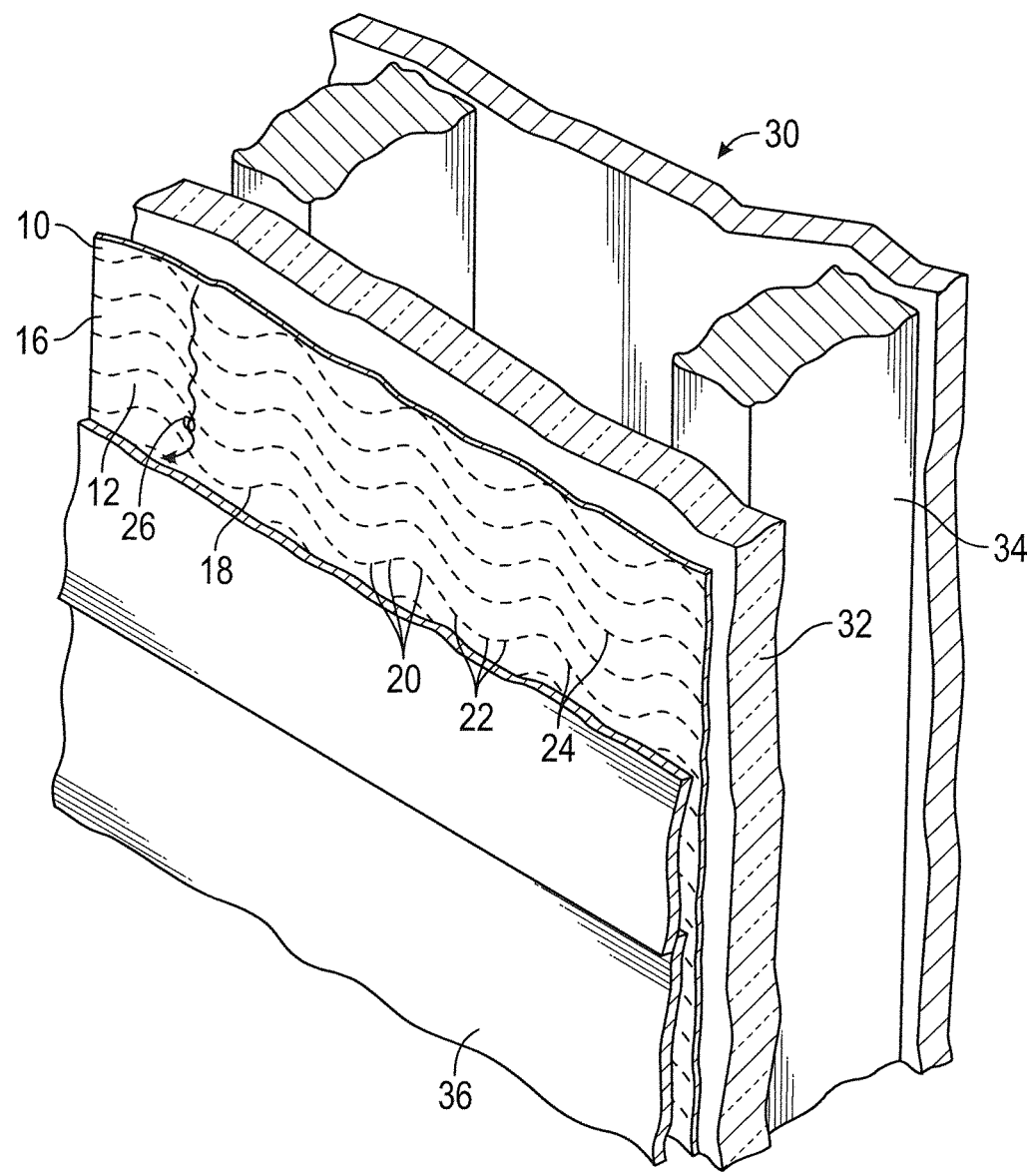
FIG. 1 is a perspective view of an exterior wall, with sections cut-away, of an assembly of a building structure according to an embodiment.
Figure 2:
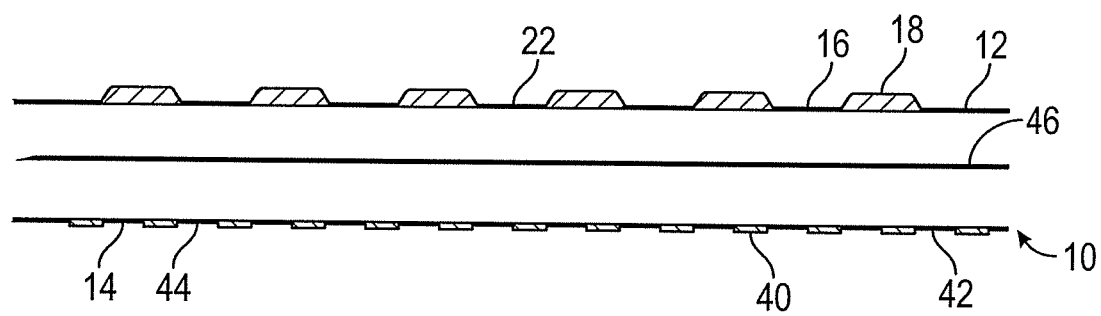
FIG. 2 is an exploded cross-sectional view of a drainage promoting wrap according to an embodiment.
Figure 3:
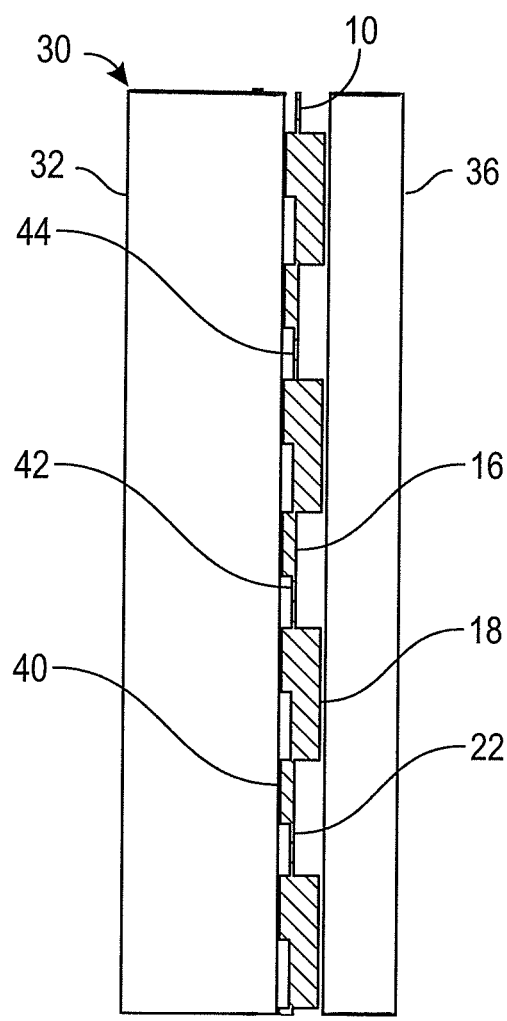
FIG. 3 is a cross-sectional view of an exterior wall of an exterior wall assembly of a building according to an embodiment.

An assembly 30 of an exterior wall of a building is illustrated in FIGS. 1 and 3 and demonstrates the use of a moisture-management composite building material 10 (i.e., a double-sided drainage-promoting house or building wrap) shown in greater detail in FIG. 2. The assembly 30 or a similar assembly may also be utilized for an exterior roof or other like structure of a building.

The assembly 30 may include generally-planar, sheet-like, inner sheathing members 32 affixed to vertically extending support posts 34. The inner sheathing members 32 may be formed of panels of plywood, oriented strand board, particle board, insulated concrete, or other building material permitted by local building codes.

During installation of the assembly 30, the moisture management building material 10 is secured as a covering on the inner sheathing members 32 such that the moisture management building material 10 completely covers an exterior surface of the inner sheathing members 32 to provide a protective barrier therefor. The moisture management building material 10 may be secured to the inner sheathing members 32, for instance, with staples or like mechanical fastener 28, or an adhesive, tape or the like, and each row thereof may extend in a generally horizontal direction within the assembly 30. Several overlapping, horizontally-extending rows of the moisture management building material 10 may be required to cover the entire elevation of the wall assembly 30. As an alternative, the moisture management building material 10 may be oriented such that the material 10 extends in substantially vertically-extending columns or in any other direction or orientation.

An exterior building material 36, such as cladding, is affixed on the outer side of the assembly 30 such that it overlies the moisture management building material 10 and sandwiches the moisture management building material 10 between the inner sheathing member 32 and exterior cladding 36. The exterior cladding 36 can be, for instance, a wood or fiber-cement siding product or wooden shingles such as cedar shakes. The exterior building material 36 can also be brick, stone, stucco, exterior insulation finish systems (EIFS), vinyl, metal, asphalt, rubber, thermoplastic, and other exterior siding or roofing material.

The moisture management building material 10 may be a double-sided drainage-promoting wrap and may be provided, for instance, in roll form. For example, the material 10 is preferably capable of being formed and provided of a relatively long length and rolled into a spiral roll enabling efficient storage and shipment of a bulk quantity of the material 10 in a relatively compact package. The moisture management building material 10 may be unrolled at the building site and applied as a weather barrier covering during the construction of an exterior wall, roof or like building structure.

As best shown in FIG. 2, the material 10 may include a weather or water resistive membrane 12 and an embossed membrane 14. The membrane 12 provides a first face 16 of the material or wrap 10 on which a series of spacer elements 18 are provided in a pattern. The primary function of the membrane 12 is to provide a water and/or air infiltration barrier that resists passage or infiltration of water, moisture and/or air from the exterior environment surrounding the building structure to the interior of the building. Thus, the membrane 12 protects the inner sheathing members 32 and like building elements of the building from damage or rot due to any moisture that may penetrate the exterior cladding 36 or like exterior building material which is otherwise exposed to the outside environment and weather conditions.

The membrane 12 may also be designed to resist air infiltration and thereby greatly contribute to a building's energy efficiency. In addition, the membrane 12 may be made of a material that is "breathable" to an extent to permit water vapor within the building to escape outwardly through the membrane 12 to a location behind the exterior cladding of a wall or roof structure.

Accordingly, the membrane 12 can be made of any weather barrier or water resistive sheet material that is sufficiently flexible as to be able to be stored and shipped in a spiral roll and applied as a wrap over the inner sheathing members 32 of a building. The membrane 12 is typically provided as an indefinite, relatively-long length of an elongate web of material that can be applied in continuous horizontally-extending rows across the inner sheathing members 32 of the building. Merely by way of example, the total length of the membrane 12 within a new spiral roll may be about 100 feet and it can have a width of 3, 5, 9 or 10 feet. Of course, other dimensions are also possible.

The membrane 12 may be made of paper, tar paper, felt, roofing felt, a polymeric material, a thermoplastic material, a synthetic resin, olefin resin, polyolefin polymer, polypropylene, high density polyethylene, polystyrene, nylon, PVC or like house-wrap material. In addition, the membrane 12 can be a woven material, a non-woven material, a dry-laid non-woven material, a wet-laid non-woven material, a hybrid non-woven material, a polymer-laid non-woven material, a spun-bonded non-woven material, a flash-spun non-woven material, or the like.

According to one embodiment, the membrane 12 is made of a non-woven material having the spacer elements 18 applied to the face 16 of the membrane 12 during manufacture of the moisture management building material 10 such that the spacer elements 18 are bonded to, and integral with, the membrane 12. Thus, installation of the membrane 12 on inner sheathing members 32 at a building site necessarily also simultaneously accomplishes installation of the spacer elements 18 thereby reducing installation time and costs.

The primary purpose of the spacer elements 18 is to space the exterior cladding 36 or like exterior building material from the face 16 of the membrane 12 thereby providing a gap therebetween. This spacing or gap created by the spacer elements 18 provides a path for moisture to drain and/or air to flow within the wall assembly 30 thereby preventing moisture accumulation. For example, moisture penetrating the exterior cladding 36, or moisture vapor passing from the interior of the building through the membrane 12, may accumulate adjacent the face 16. However, the spacing or gap created between the face 16 and the cladding 36 permits moisture to drain along the face 16 such as under the force of gravity behind the cladding 36. Air circulation within this open space also helps to evaporate and remove moisture.

According to an embodiment, the space or gap provided by the spacer elements 18 between the face 16 of the membrane 12 and the exterior cladding 36 may be about 1 mm or greater. Of course, the amount of spacing can be altered as desired by altering the height to which the spacer elements 18 extend from the face 16 during formation of the material 10. The 1 mm or greater height of the spacer elements 18 is believed to provide sufficient spacing and produce a gap needed to ensure proper, quick and efficient drainage. However, a lesser height may be used.

The spacer elements 18 may be formed of a polyolefin. In one embodiment, the spacer elements are a solidified material initially applied in a liquid or semi-liquid form to the face 16 before solidification. For instance, the spacer elements 18 may be a hot-molt material, such as a hot-melt adhesive or the like.

The pattern of spacer elements 18 applied to the membrane 12 needs to ensure that the spacer elements 18 are uniformly located throughout the face 16 so that the desired spacing is provided continuously throughout the wall assembly 30. However, the spacer elements 18 must only cover a minimum amount of the surface area of the face 16. This is because the pattern of spacer elements 18 must not cause draining moisture to become trapped by the presence of the spacer elements 18 and because the spacer elements 18 must permit the membrane 12 to remain "breathable" with respect to escape of water vapor from within the building through the membrane 12.

As shown in the drawings, the spacer elements 18 may be applied in the form of short-length, individual, line-segments, dots, or dashes 20 which are separate and spaced from one another. The open space between and around adjacent dashes 20 provides an opening 22 through which moisture can drain and ambient air can flow. The dashes 20 can be arranged to provide a pattern of discontinuous lines 24 (i.e., alternating arrays of aligned dashes 20 and openings 22) generally extending along the length direction of the membrane 12. Of course, the discontinuous lines 24 of separate dashes 20 of spacer elements 18 can also extend diagonally across the face 16, randomly across the face 16, or in any other pattern or shape.

As one contemplated pattern of spacer elements 18, the dashes 20 may be arranged to form a uniform series of discontinuous undulating, wavy or sinusoidal lines 24. The corresponding dashes 20 in each adjacent line 24 can be aligned with each other as best illustrated in FIG. 1 to create unobstructed vertical drainage passages 26 across the face 16 of the membrane 12. Alternatively, the dashes 20 can be staggered.

By way of example, the length of each dash 20 may be about 0.4 inch or 10 mm and the spacing or opening 22 between each pair of dashes in the same line 24 may be about 0.4 inch or 10 mm. The thickness or height of each dash may be about 0.04 inch or 1 mm or greater. The spacing between each discontinuous sinusoidal line 24 of dashes 20 may be about 1 inch and the amplitude of each wave of the line 24 may be about 1 inch. The wavelength of each line 24 may be about 4 inches. Of course, all these dimensions can be changed, as needed.

As best shown in FIG. 2, the material or wrap 10 may also include an embossed membrane 14 that engages and directly confronts the inner sheathing members 32 in the wall assembly 30. According to an embodiment, the embossed membrane 14 may be a non-woven material that is embossed to form raised embossments 40 thereon. As an alternative, the membrane 14 could be made of other materials, such as a woven material.

Each embossment 40 may extend from a face 42 of the membrane 14 to a height that permits incidental drainage of water that may be captured behind the material 10. According to an embodiment, the embossments 40 are of a height less than that of the spacing elements 18. For instance, the height of the embossments may be less than about 1 mm. The embossments 40 provide a gap permitting drainage or evaporation of any moisture that may penetrate or condense on a surface of the inner sheathing members 32 beneath the material 10. Thus, similar to the spacer elements 18, the embossments 40 space a rear face 42 of the material or wrap 10 from the inner sheathing members 32, and the spaces, gaps, or openings 44 provided between the embossments 40 provide drainage and ventilation paths within the assembly 30.

Thus, any moisture which penetrates the cladding 36 is provided with a path to drain downwardly under the force of gravity and out of the assembly 30 and any moisture which is located between the material 10 and the sheathing members 32 is permitted to drain. The spaces created by the spacer elements 18 and embossments 40 also enable the circulation of air between the inner sheathing members 32 and exterior building material 36 on both sides of the material or wrap 10 to aid in drying or evaporating any moisture present within the assembly 30.

As best shown in FIG. 2, a breathable intermediate film 46 may be located or sandwiched between the membranes 12 and 14. During manufacture of the material 10, the film 46 enables bonding of the membrane 12 with the embossed rear membrane 14. The film 46 may be made of a polymeric material, a thermoplastic material, a synthetic resin, olefin resin, polyolefin polymer, polypropylene, high density polyethylene, polystyrene, nylon, PVC or any other material that enables the front and rear membranes to be bonded together without flattening the embossments 40 of the embossed membrane 14.

Accordingly, the above-described drainage-promoting wrap and wall and roof assemblies according to the present invention provide a cost-effective building product for use in managing moisture within wall, roof and other exterior building structures.

While preferred wraps and assemblies have been described in detail, various modifications, alterations, and changes may be made without departing from the spirit and scope of the present invention as defined in the appended claims.

The invention claimed is:

1. A drainage-promoting wrap for a building structure, comprising:
   a weather-resistive membrane having continuously smooth and flat front and rear faces;
   a series of separate, spaced-apart, spacer elements bonded only to said front face of said weather-resistive membrane and projecting therefrom to a first predetermined height such that all spacer elements are of equal height; and
   an embossed membrane having a front face with a series of raised embossments projecting therefrom to a second predetermined height such that all raised embossments are of equal height, said embossed membrane having raised embossments projecting only from said front face and not from an opposite rear face of said embossed membrane;
   said weather-resistive membrane and said embossed membrane being bonded together to form a double-sided drainage-promoting wrap such that said spacer elements project from a first face of the wrap and said embossments project from an opposite face of the wrap and such that said smooth and flat rear face of said weather-resistive membrane faces said rear face of said embossed membrane; and
   said first predetermined height is greater than said second predetermined height.

2. The drainage-promoting wrap according to claim 1, wherein the weather-resistive membrane is made of a woven or non-woven material.

3. The drainage-promoting wrap according to claim 2, wherein said spacer elements are formed of a polyolefin.

4. A drainage-promoting wrap according to claim 3, wherein each of said spacer elements is in the form of a short-line segment or dash, wherein a plurality of said elements form a series of uniformly spaced-apart discontinuous undulating lines across said front face of said weather-resistive membrane, and wherein spacing between adjacent elements in the same discontinuous undulating line and in adjacent discontinuous undulating lines forms drainage passages on said front face of said weather-resistive membrane.

5. The drainage-promoting wrap according to claim 1, wherein the embossed membrane is made of a woven or non-woven material.

6. The drainage-promoting wrap according to claim 1, further comprising a film sandwiched between the weather-resistive membrane and said embossed membrane and confronting said smooth and flat rear face of said weather-resistive membrane and said rear face of said embossed membrane.

7. The drainage-promoting wrap according to claim 6, wherein the film is made of a polymeric material which performs the bonding together between the weather-resistive membrane and the embossed membrane.

8. The drainage-promoting wrap according to claim 1, wherein the wrap is elongate and sufficiently flexible to be storable in a spiral roll.

9. An assembly of an exterior building structure, comprising:
an inner sheathing member;
an exterior building material secured over said inner sheathing member and covering said inner sheathing member; and
a double-sided drainage-promoting wrap extending within the assembly between said inner sheathing member and said outer building material;
said double-sided drainage-promoting wrap comprising a weather-resistive membrane having continuously smooth and flat front and rear faces, a series of separate, spaced-apart, spacer elements bonded only to said front face of said weather-resistive membrane and projecting therefrom to a first predetermined height such that all spacer elements are of equal height, and an embossed membrane having a front face with a series of raised embossments projecting therefrom to a second predetermined height such that all raised embossments are of equal height, said embossed membrane having raised embossments projecting only from said front face and not from an opposite rear face of said embossed membrane;
said weather-resistive membrane and said embossed membrane of said double-sided drainage-promoting wrap being bonded together such that said spacer elements project from a first face of the wrap and engage and confront said exterior building material and said embossments project from an opposite face of the double-sided drainage-promoting wrap and engage and confront said inner sheathing member and such that said smooth and flat rear face of said weather-resistive membrane faces said rear face of said embossed membrane; and
said first predetermined height is greater than said second predetermined height.

10. The assembly according to claim 9, wherein the weather-resistive membrane is made of a woven or non-woven material, and the spacer elements are formed of a hot-melt material.

11. The assembly according to claim 10, wherein the double-sided drainage-promoting wrap further comprises a polymeric film sandwiched between the weather-resistive membrane and said embossed membrane and directly confronting said smooth and flat rear face of said weather-resistive membrane and said rear face of said embossed membrane.

12. The assembly according to claim 11, wherein said inner sheathing member includes a panel of plywood, oriented strand board, particle board, or insulated concrete.

13. The assembly according to claim 11, wherein said exterior building material is selected from the group consisting of exterior cladding, a wood or fiber-cement siding product, wooden shingles, cedar shakes, brick, stone, stucco, an exterior insulation finish system (EIFS), and vinyl, metal, asphalt, rubber, or thermoplastic siding or roofing material.

14. A method of producing a double-sided drainage-promoting wrap for a building structure, comprising the steps of:
applying a series of separate, spaced-apart, spacer elements to a face of a weather-resistive membrane such that the spacer elements project therefrom to a first predetermined height such that all spacer elements are of equal height;
bonding a separate embossed membrane to said weather-resistive membrane such that said spacer elements project from a first face of the wrap, said embossed membrane having raised embossments projecting from a face thereof to a second predetermined height such that said embossments project from an opposite face of the wrap, wherein the first predetermined height is greater than said second predetermined height such that all raised embossments are of equal height;
said weather-resistive membrane having continuously smooth and flat front and rear faces and the series of separate, spaced-apart, spacer elements being bonded only to the front face of the weather-resistive membrane; and
said embossed membrane having a front face and an opposite rear face with the series of raised embossments projecting only from said front face and not from the rear face of the embossed membrane; and
said weather-resistive membrane and said embossed membrane being bonded together such that said smooth and flat rear face of said weather-resistive membrane faces said rear face of said embossed membrane.

15. A method according to claim 14, wherein the weather-resistive membrane is made of a woven or non-woven material, the spacer elements are formed of a polyolefin, and the embossed membrane is made of a woven or non-woven material, and wherein a polymeric film is sandwiched between the weather-resistive membrane and the embossed membrane to bond the weather-resistive membrane to the embossed membrane.

* * * * *